United States Patent
Failor

[19]

[11] Patent Number: 6,109,435
[45] Date of Patent: Aug. 29, 2000

[54] TOOL KIT FOR CONTAINING TRUCK REPAIR TOOLS

[76] Inventor: Michael E. Failor, 990 Rd. 230, Bellefontaine, Ohio 43311

[21] Appl. No.: 08/814,550

[22] Filed: Mar. 11, 1997

[51] Int. Cl.$^7$ .................................................. B65D 85/28
[52] U.S. Cl. .......................... 206/373; 206/557; 220/505; 220/555
[58] Field of Search ..................... 206/373, 557, 206/564; 220/503, 505, 555, 608, 735

[56] References Cited

U.S. PATENT DOCUMENTS

| | | | |
|---|---|---|---|
| 1,186,073 | 6/1916 | Brown et al. | 224/42.13 |
| 1,938,739 | 12/1933 | Coombes . | |
| 2,649,606 | 8/1953 | Fadner . | |
| 2,670,260 | 2/1954 | Watt . | |
| 2,818,316 | 12/1957 | D'Andrade . | |
| 2,897,974 | 8/1959 | Cook . | |
| 2,962,333 | 11/1960 | Policastro . | |
| 2,988,206 | 6/1961 | Olson | 206/19.2 |
| 3,048,457 | 8/1962 | Haase . | |
| 3,394,849 | 7/1968 | Streeter . | |
| 3,618,749 | 11/1971 | Vaccaro | 206/373 |
| 3,907,105 | 9/1975 | Nowak | 220/555 |
| 3,909,092 | 9/1975 | Kiernan | 220/555 |
| 4,136,904 | 1/1979 | Lauderdale | 296/37.1 |
| 4,169,532 | 10/1979 | Scapellati | 206/557 |
| 4,341,304 | 7/1982 | Diller | 206/349 |
| 4,412,618 | 11/1983 | La Conte | 206/373 |
| 4,613,041 | 9/1986 | Carlton | 206/373 |
| 4,817,808 | 4/1989 | Bracy | 220/503 |
| 4,991,712 | 2/1991 | Wagner | 206/564 |
| 5,160,026 | 11/1992 | Marsh | 206/373 |
| 5,195,778 | 3/1993 | Dismuke | 280/770 |
| 5,544,744 | 8/1996 | Oman | 206/373 |

*Primary Examiner*—David T. Fidei
*Attorney, Agent, or Firm*—Roger S. Dybvig

[57] ABSTRACT

A tool kit for containing truck or tractor repair tools and parts includes an elongate, unitary body adapted to be supported by the upper peripheral portion of a front tire on either side of a cab-over-engine tractor. The body has a front section and a rear section on which are provided transverse trays for tools or repair parts, a center section having a horizontal plate for the temporary support of tools or parts, and an outer sidewall with larger, longitudinally-extending trays for holding larger tools or parts. The three body sections have a single base wall which has a radius approximately equal to the radius of a tractor tire on which the kit is designed to be supported. The center section includes a pair of handles extending upwardly from the base wall at the forward and rearward ends, respectively, of the horizontal plate.

24 Claims, 5 Drawing Sheets

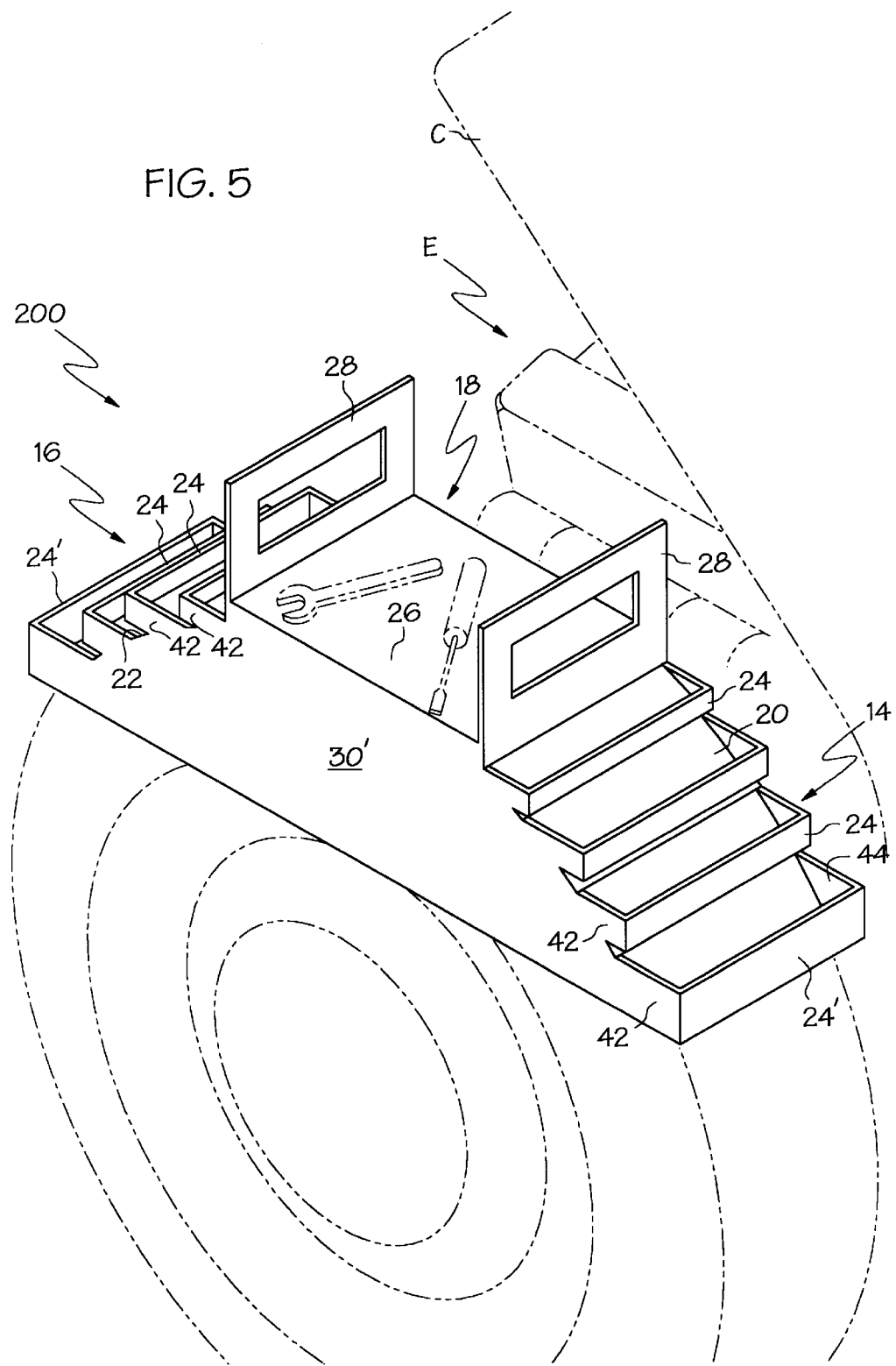

TOOL KIT FOR CONTAINING TRUCK REPAIR TOOLS

FIELD OF THE INVENTION

This invention relates to a tool kit for containing truck repair tools and more particularly to a tool kit for containing truck repair tools that is intended to be supported on top of one of the wheels of a cab-over-engine tractor.

BACKGROUND OF THE INVENTION

A mechanic working on the engine of a cab-over-engine tractor often climbs into the into engine compartment and places any needed tools on top of the engine or other convenient surfaces in the compartment, or on top of one or more of the front wheels. If an additional tool is needed, the mechanic must climb out of the engine compartment to get the tool and then back into the compartment to continue working. Tool trays are shown in Diller, U.S. Pat. No. 4,341,304, designed to be supported by a front wheel of a tractor. These would be useful for temporarily holding a selected set of tools so that they can be located in one conveniently available place while the mechanic is working on an engine, but the Diller tool trays are not designed to provide a permanent holder for a large number of tools.

SUMMARY OF THE INVENTION

An object of this invention is to provide an improved tool kit for containing cab-over-engine tractor or truck repair tools and parts. A more particular object of this invention is to provide a tool kit for tractor or truck repair tools and repair parts which can be placed on a floor or counter to store a large number of tools and parts and which can easily be placed on a tractor wheel to serve as a rack for the stored tools and parts for convenient access by a mechanic working in the engine compartment of a cab-over-engine tractor.

In accordance with this invention, a tool kit is provided for containing truck or tractor repair tools and parts that includes an elongate, unitary body adapted to be supported by the upper peripheral portion of a truck or tractor tire. The body has a front section, a rear section, and a center section. The front section has an upwardly-facing front wall that slopes forwardly and downwardly and the rear section has an upwardly-facing rear wall that slopes rearwardly and downwardly. The kit is preferably constructed such that it can be supported either by a front right wheel or a front left wheel of a tractor. In this connection, it will become apparent that the "front section" of a kit supported by a right front wheel of a tractor is the "rear section" when the kit is supported by a left front wheel. Accordingly, the terms "front" and "rear" used herein in reference to the sections of the body are used in a relative sense and not an absolute sense.

A set of upwardly-open tool-supporting trays extending transversely of the front and rear sections are formed on the kit body, the set of trays including at least one tray, and preferably more than one tray formed on each of the front and rear sections. The center section has a substantially horizontal top surface that provides a convenient surface for the temporary support of tools being used by a mechanic. The center section also preferably has a handle assembly including at least one handle. In the preferred practice of this invention, a pair of handles are provided, one at each end of the horizontal top surface, for use in lifting the kit onto and off of a tractor tire.

To provide a stable support for the kit when it is placed on a floor or counter in an upright orientation, the set of trays includes a pair of trays located, respectively, at the lowermost ends of the front body section and the rear body section, such trays having mutually-coplanar bottom surfaces which can rest on the floor or counter with the tool kit maintained in a stable, upright orientation for storage of tools and parts in the trays.

For rigidity of construction and to provide for additional trays, the tool kit further includes an outer sidewall. A longitudinally-extending tray at the lower end of the outer sidewall is preferably provided that has a bottom surface coplanar with the trays at the lowermost parts of the front and the rear body sections to provide additional stability for the support of the kit on a floor or counter.

In the preferred construction of a tool kit in accordance with this invention, the front, rear and center body sections have a single base wall formed by a single strip of flat sheet material formed substantially as an arc of a circle of a radius that so nearly approximates the radius of a tractor tire on which the tool kit may be supported that the base wall closely overlies along its length a segment of the tractor tire. The transverse trays and the handles project from the base wall, with the base wall forming the inner wall of each of the transverse trays.

In addition to the outer sidewall, the kit has an inner sidewall extending upwardly from and along the base wall. Parts of the inner sidewall and the outer sidewall provide end walls for the transverse trays. The kit is approximately as wide as a tractor tire on which the kit is designed to be supported. In one embodiment, the inner sidewall extends below the circular base wall and the two sidewalls straddle a tractor tire on which the kit is placed. In another and presently preferred embodiment, the bottom edge of the inner sidewall is coextensive with the circular base wall so that the tool kit can be supported by tractor tires that are wider than the circular base wall.

Other objects and advantages will become apparent from the following description and the drawings.

BRIEF DESCRIPTION OF THE DRAWINGS

FIG. 1 also shows, in phantom lines, a pair of tools supported by the kit and fragments of the tractor including the right front wheel on which the tool kit is supported.

FIG. 5 is a perspective view similar to FIG. 1 but showing a second modified tool kit in accordance with this invention.

DETAILED DESCRIPTION

Figure 1:
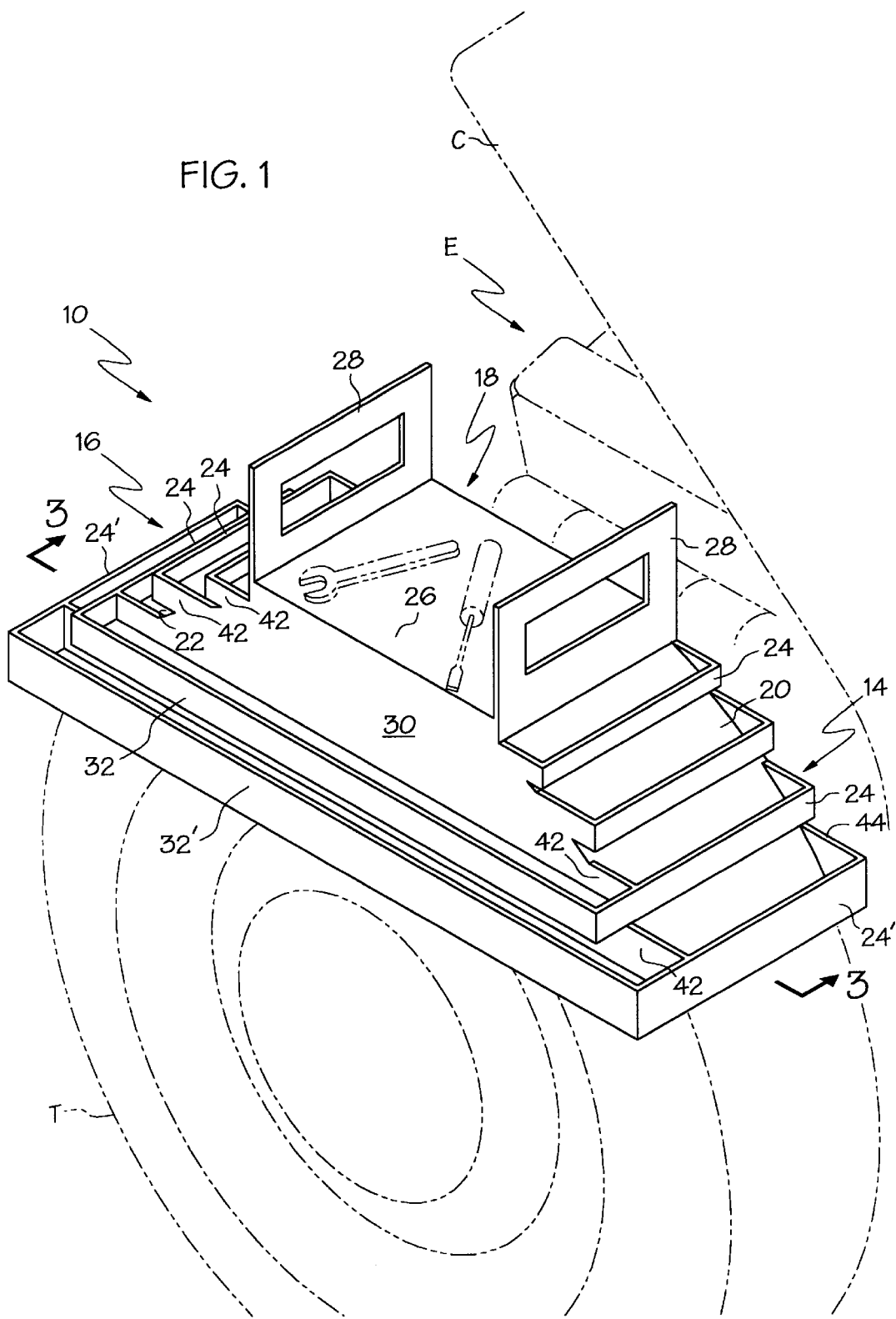
FIG. 1 is a perspective view of a tool kit for containing truck repair tools in accordance with this invention, viewed generally from the front, right or passenger side of a tractor.
Figure 2:
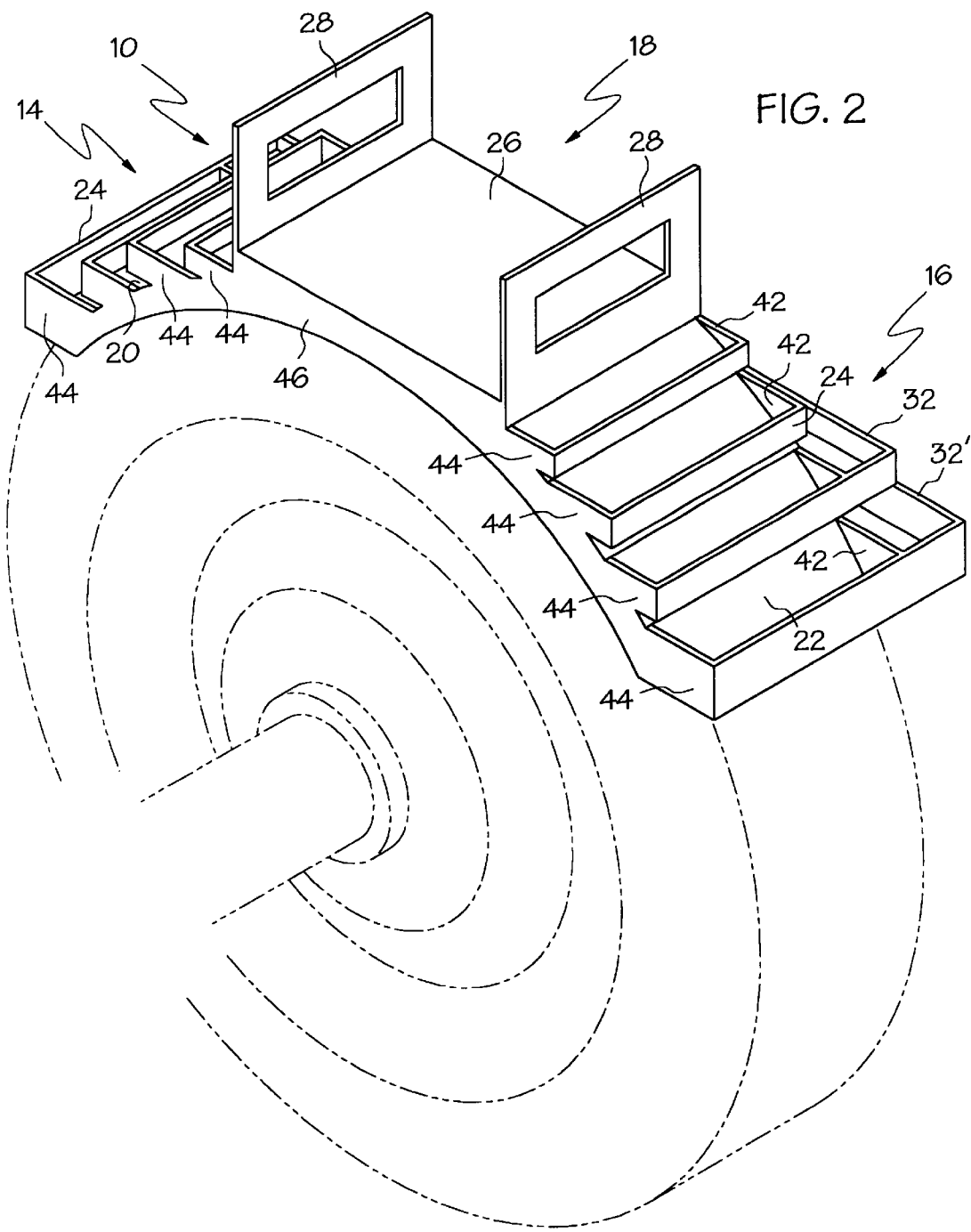
FIG. 2 is a perspective view of the tool kit of FIG. 1 and fragments (shown in phantom) of the right front tire of the tractor viewed generally from a direction opposite to that of FIG. 1.
Figure 3:
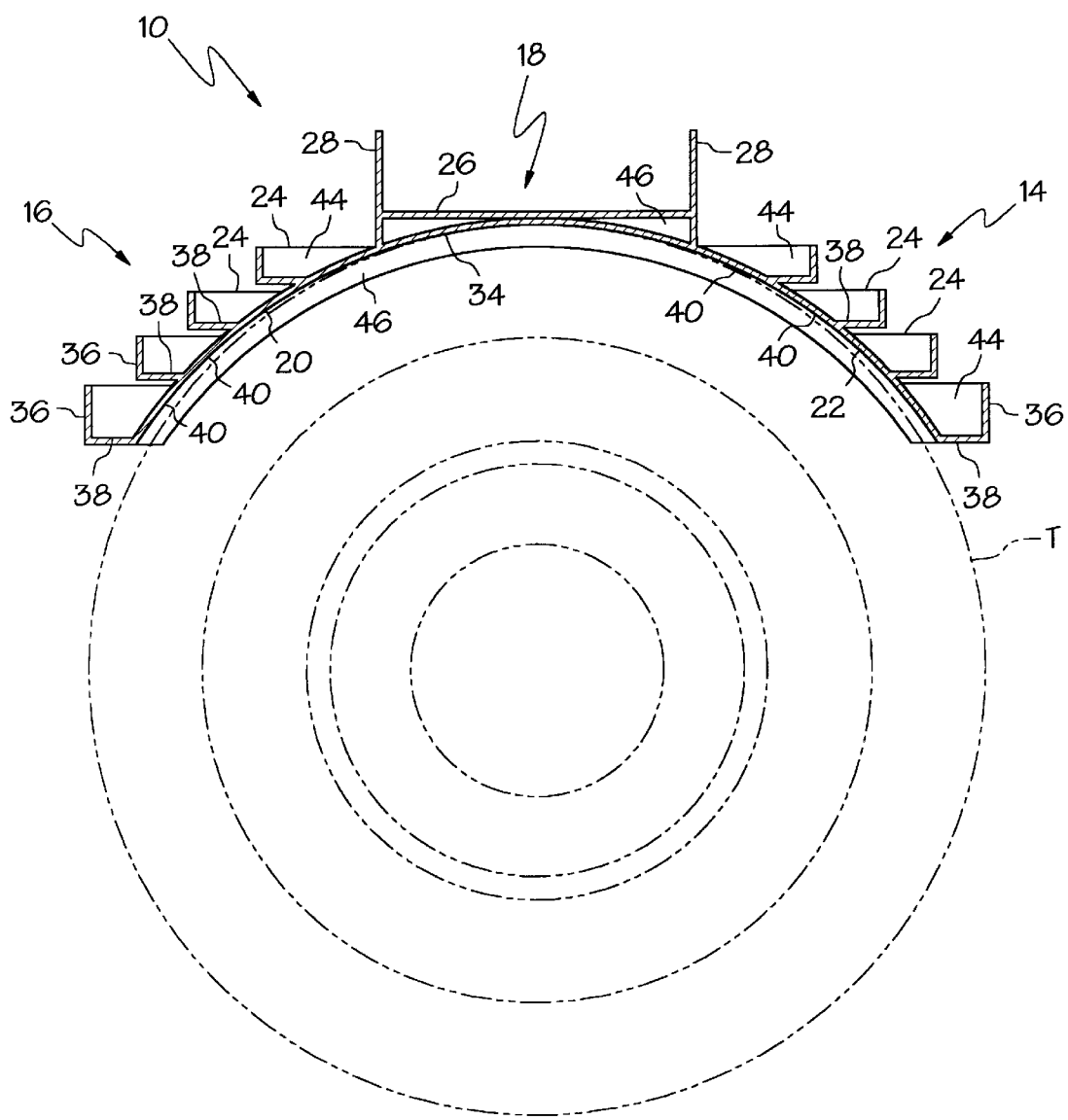
FIG. 3 is longitudinal cross-sectional view of the tool kit, taken along lines 3—3 of FIG. 1 and shows, in phantom lines, a side elevational view of the wheel and tire on which the kit is supported, viewed as if looking toward the tractor from the right side.

With reference to FIGS. 1, 2 and 3, this invention provides a tool kit, generally designated 10, for containing truck or tractor repair tools and parts. The kit 10 comprises an elongate, longitudinally-extending, unitary body made from a suitable construction material, such as wood, metal or plastic, adapted to be supported by the upper peripheral portion of a truck or tractor tire T of a truck having a cab C shown raised to provide access to its engine compartment E. The kit body has three sections, namely, a front section 14, a rear section 16, and a center section 18. The front section 14 has an upwardly-facing front wall 20 that slopes forwardly and downwardly and the rear section 16 has an upwardly-facing rear wall 22 that slopes rearwardly and downwardly.

A set of upwardly-open tool and repair parts-supporting trays 24 extend transversely across the front body section 14 and the rear body section 16. There are four transverse trays 24 shown in the drawings on each of the front and the rear body sections 14 and 16. Mutually adjacent ones of the trays 24 are both horizontally and vertically spaced from one another. In practice there could be fewer than four transverse trays 24 or more than four transverse trays 24. However, there are preferably at least two transverse trays 24, one on each of the front body section 14 and the rear body section 16.

The center section 18 has a substantially horizontal center plate 26 that provides a convenient, upwardly-facing, flat and substantially horizontal surface for the temporary support of tools being used by a mechanic. The center section 18 preferably also has a handle assembly including at least one handle. In the preferred practice of this invention, a pair of handles 28 are provided, one at each of the forward and rearward ends of the horizontal center plate 26, for use in lifting the kit 10 onto and off of a tractor tire. The handles 28 may be apertured as illustrated to serve as hand grips.

To provide a stable support for the kit 10 when it is placed on a floor or counter in an upright orientation, the set of transverse trays 24 includes a pair of transverse trays, designated 24', respectively located at the lowermost ends of the front body section 14 and the rear body section 16. Such transverse trays 24' have mutually-coplanar bottom surfaces which can rest on the floor or counter with the tool kit 10 maintained in a stable, upright orientation for storage of tools and parts in the trays 24 when the tool kit 10 is not perched on a truck or tractor tire.

For rigidity of construction, the tool kit 10 further includes a plate-like outer sidewall 30 spanning the three body sections 14, 16 and 18 and joins to the horizontal center plate 26. For holding larger tools or parts, one or more longitudinally-extending trays 32 extend along the sidewall 30. Preferably, to provide additional stability for the support of the kit 10 on a floor or counter, one of the trays, designated 32', which extends along the lower portion of the outer sidewall 30, has a bottom surface coplanar with the transverse trays 24' described above located at the lower ends of the front and rear body sections 14 and 16.

With reference to FIG. 3, in the preferred construction of a tool kit 10 in accordance with this invention, the front body section 14, the rear body section 16 and the center body section 18 have a single base wall 34 formed of a single strip of flat sheet material. Sections of the base wall 34 form the front wall 20 and the rear wall 22. The base wall 34 has a width approximately as wide as a tractor tire on which the kit 10 is designed to be supported. The longitudinal cross-section of the base wall 34 is in the form of an arc of a circle having a radius approximately equal to the radius of a tractor tire on which the kit 10 is to be placed. Accordingly, the base wall 34 closely overlies along its entire length a segment of the tractor tire T. The horizontal center plate 26 is suspended between the two handles 28 which extend upwardly from the center portion of the base wall 34.

The transverse trays 24 are generally L-shaped in cross-section and have outer or front walls 36 and bottom walls 38. Their inner or rear walls, designated 40, comprise portions of the elongate base wall 34. With reference also to FIG. 1, the outside end walls, designated 42, of the transverse trays 24 are preferably coplanar with and join to portions of the outer sidewall 30. With reference to FIGS. 2 and 3, the inside end walls 44 of the transverse trays 24 are coplanar with and joined to an inner sidewall 46 that also joins to the base wall 34. The inner sidewall 46 extends slightly below the level of the base wall 34, as illustrated in FIGS. 2 and 3, so that the sides of a tractor tire on which the kit 10 is supported are straddled by the both the outer sidewall 30 and the inner sidewall 46. The extension of the inner wall 46 below the level of the base wall 34 is relatively small so that one need not raise the tool kit 10 significantly higher than the top of a tractor tire when placing the kit 10 onto the tire or removing it from the tire.

As is evident in FIG. 1, the longitudinally-extending trays 32 are constructed similarly to the transverse trays 24, except that the inside or rear walls of the longitudinal-extending trays 32 are vertical in contrast to the sloping inner or rear walls of the transverse trays 24. Also, the bottom wall of the lower longitudinally-extending tray 32' is optionally wider, i.e., protrudes further from the sidewall 30, than the bottom wall of the upper longitudinally-extending tray 32 to provide for better access to the lower tray 32'. The same consideration need not apply to the transverse trays 24 because mutually adjacent ones of the transverse trays 24 are horizontally spaced from one another in addition to being vertically spaced from one another.

Figure 4:
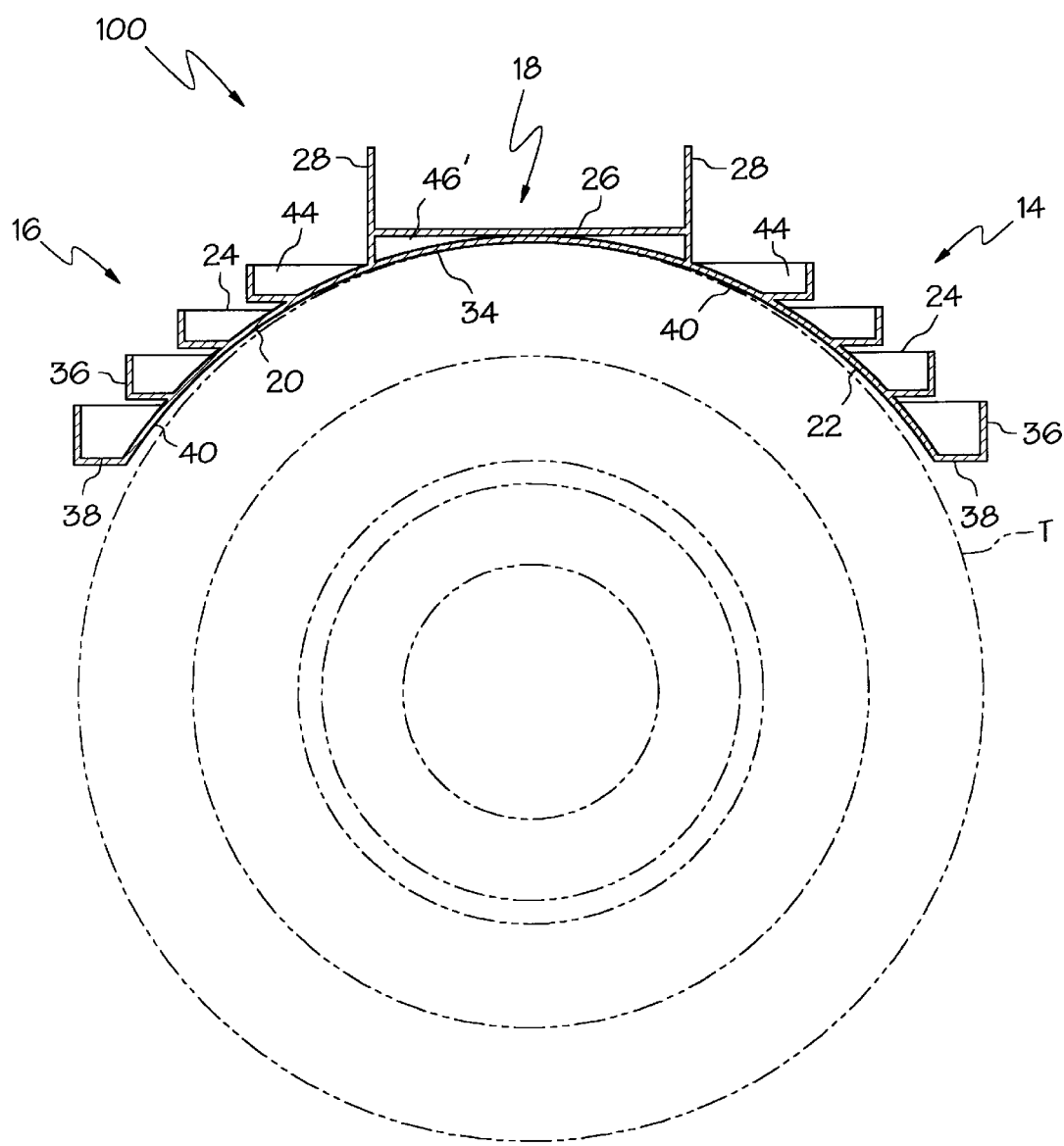
FIG. 4 is a longitudinal cross-sectional view similar to FIG. 3 but showing a modified tool kit in accordance with this invention.

FIG. 4, in which like reference numbers are applied to parts that may be identical to parts of the tool kit 10 described above, shows a modified tool kit 100 in accordance with this invention. The tool kit 100 is identical to the tool kit 10 of FIGS. 1, 2 and 3, except that its inner sidewall, designated 46', extends only along the center section 18 and only between the horizontal plate 26 and the inside edge of the center portion of the elongate base wall 34. No part of the inner wall 46' extends below the level of the base wall 34 so that the kit 100 can be supported on tires having a width greater than the width of the circular base wall 34 without interference from the inner wall 46'.

When using either the tool kit 10 or the tool kit 100, it may be possible to reverse the orientation of the tool kit so that its outer sidewall is between the front wheel and the engine compartment. This would locate the longitudinally-extending tray or trays 32 closer to a mechanic working in the engine compartment.

FIG. 5, in which like reference numbers are applied to parts that may be identical to parts of the tool kit 10 described above, shows another modified tool kit 200 in accordance with this invention. The tool kit 200 is identical to the tool kit 100 of FIG. 4 except that there are no longitudinal trays extending along its outer sidewall, designated 30'. Such a tool kit 200 may be useful for holding socket sets or other small tools and would be lighter in weight than the tool kits 10 and 100.

Although the presently preferred embodiments of this invention has been described, it will be understood that within the purview of the invention various changes maylbe made within the scope of the following claims.

Having thus described my invention, I claim:

1. A tool kit for placement on a front tire of a cab-over-engine tractor, said kit comprising:

a unitary body constructed to extend circumferentially along and be supported by the upwardly-facing surface of a ground-engaging tractor tire from high the tractor derives support, said body comprising a front section having a front end and a rear end and which slopes forwardly and downwardly from its rear end to its front end, a rear section having a front end and a rear end and which slopes rearwardly and downwardly from its front end to its rear end, and a center section located between and joining with said rear end of said front section and said front end of said rear section; and a set of upwardly-open, transverse trays including at least one tray extending transversely across each of said front section and said rear section beneath the level of said center section.

2. The tool kit of claim 1 wherein said set of transverse trays includes a pair of transverse trays respectively located at the lowermost ends of said front section and said rear section which have bottom surfaces which are mutually coplanar so that said bottom surfaces may rest on a floor or counter to support said tool kit upright in a stable position for storage of tools and parts in said trays.

3. The tool kit of claim 1 wherein said center section comprises a substantially horizontal, tool-supporting surface.

4. The tool kit of claim 1 wherein said center section comprises a substantially horizontal, tool-supporting plate.

5. The tool kit of claim 1 further comprising a pair of handles for use in lifting the kit onto and off of a tire.

6. The tool kit of claim 5 wherein each of said handles comprises an apertured plate.

7. The tool kit of claim 1 further comprising an outer sidewall joined to said front, rear and center sections.

8. The tool kit of claim 7 further comprising at least one upwardly-open, longitudinal tray that extends longitudinally along said outer sidewall.

9. The tool kit of claim 7 further comprising an inner sidewall joined to said center section.

10. The tool kit of claim 9 wherein said inner sidewall is also joined to said front section and to said rear section.

11. The tool kit of claim 1 wherein said front, rear and center body sections comprise a single base wall.

12. The tool kit of claim 11 wherein said base wall has a radius approximately equal to the radius of a tractor tire on which the kit is designed to be supported.

13. The tool kit of claim 11 wherein said set of transverse trays includes a pair of transverse trays respectively located at the lowermost ends of said front section and said rear section which have bottom surfaces which are mutually coplanar so that said bottom surfaces may rest on a floor or counter to support said tool kit upright in a stable position for storage of tools and parts in said trays.

14. The tool kit of claim 11 wherein said center section comprises a substantially horizontal, tool-supporting surface.

15. The tool kit of claim 11 wherein said center section comprises a substantially horizontal, tool-supporting plate.

16. The tool kit of claim 11 further comprising a pair of handles for use in lifting the kit onto and off of a tire.

17. The tool kit of claim 16 wherein each of said handles comprises an apertured plate.

18. The tool kit of claim 11 further comprising an outer sidewall joined to said front, rear and center sections.

19. The tool kit of claim 18 further comprising at least one upwardly-open, longitudinal tray that extends longitudinally along said outer sidewall.

20. The tool kit of claim 18 further comprising an inner sidewall joined to said center section.

21. The tool kit of claim 20 wherein said inner sidewall extends above and not below the level of said base wall.

22. The tool kit of claim 20 wherein said inner sidewall extends both above and below the level of said base wall.

23. The tool kit of claim 20 wherein said inner sidewall is also joined to said front section and to said rear section.

24. The tool kit of claim 23 wherein said inner sidewall extends both above and below the level of said base wall.

* * * * *